(12) United States Patent
Studnicka et al.

(10) Patent No.: US 11,650,173 B2
(45) Date of Patent: *May 16, 2023

(54) GRADING A PISTON WITH DEPOSITS USING THERMAL SCAN DATA

(71) Applicant: Caterpillar Inc., Peoria, IL (US)

(72) Inventors: Seth C. Studnicka, Chillicothe, IL (US); Alex T. Edwin, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 773 days.

This patent is subject to a terminal disclaimer.

(21) Appl. No.: 16/671,650

(22) Filed: Nov. 1, 2019

(65) Prior Publication Data

US 2021/0131987 A1    May 6, 2021

(51) Int. Cl.
*G01N 25/00* (2006.01)
*G01N 25/72* (2006.01)
*F16J 1/00* (2006.01)
*G01N 29/22* (2006.01)
*G01J 5/00* (2022.01)

(52) U.S. Cl.
CPC ............... *G01N 25/72* (2013.01); *F16J 1/00* (2013.01); *G01N 29/228* (2013.01); *G01J 5/00* (2013.01); *G01N 2291/02881* (2013.01)

(58) Field of Classification Search
CPC ............... G01N 25/72; G01N 29/228; G01N 2291/02881; F16J 1/00; G01J 5/00
See application file for complete search history.

(56) References Cited

U.S. PATENT DOCUMENTS

| 4,854,162 A * | 8/1989 | Yerace ............... G01M 13/04 374/4 |
| 5,922,948 A | 7/1999 | Lesko et al. |
| 7,060,971 B2 | 6/2006 | Zombo et al. |
| 9,957,887 B2 | 5/2018 | Roe et al. |
| 2008/0003361 A1* | 1/2008 | Altin ............... C23C 16/45523 427/255.19 |
| 2008/0298426 A1* | 12/2008 | Koschack ............ F23M 5/08 374/7 |
| 2010/0095910 A1* | 4/2010 | Phelps .................. F01M 1/08 123/41.35 |
| 2016/0084195 A1* | 3/2016 | Ishii .................... F02F 3/22 123/193.6 |

(Continued)

FOREIGN PATENT DOCUMENTS

CN          201765103 U  *  3/2011
CN          106596579 A  *  4/2017

(Continued)

*Primary Examiner* — Gail Kaplan Verbitsky
(74) *Attorney, Agent, or Firm* — Bookoff McAndrews, PLLC

(57) ABSTRACT

A method and system for grading pistons with deposits is disclosed. In an embodiment, a piston with an outer surface and deposits upon the outer surface is increased in temperature and thermally scanned. The deposits are identified based on the temperature differences measured with respect to the temperature of the outer surface of the piston. Deposit characteristics can be generated from the identified locations of deposits and the magnitude of temperature difference with respect to the outer surface. The deposit characteristics are recorded and used to grade the pistons.

20 Claims, 3 Drawing Sheets

(56) References Cited

U.S. PATENT DOCUMENTS

| | | | |
|---|---|---|---|
| 2016/0159011 A1* | 6/2016 | Marchione | B29C 64/386 |
| | | | 700/98 |
| 2016/0309097 A1 | 10/2016 | Fischer | |
| 2018/0348070 A1 | 12/2018 | Wang et al. | |
| 2020/0173394 A1* | 6/2020 | Shin | F02F 3/12 |

FOREIGN PATENT DOCUMENTS

| | | | | |
|---|---|---|---|---|
| CN | 109072764 A | * | 12/2018 | ......... F02B 23/0678 |
| CN | 113187618 A | * | 7/2021 | ............... F02F 3/00 |
| JP | 3835916 B2 | * | 10/2006 | ............... F02F 3/12 |
| JP | 2013500425 A | * | 1/2013 | |
| JP | 2016216218 A | * | 12/2016 | |
| WO | WO-2019103749 A1 | * | 5/2019 | ............... F01M 1/08 |

\* cited by examiner

GRADING A PISTON WITH DEPOSITS USING THERMAL SCAN DATA

TECHNICAL FIELD

The present disclosure generally pertains to a piston, and is directed towards grading a piston with deposits using thermal scan data.

BACKGROUND

Systems employing hydrocarbon fuels can accumulate deposits on the surfaces of pistons. One of the commonly used methods for rating engines involves examination of a test piston which has been subjected to many hours of operation in a running engine. Engine design can be evaluated, in part, by visually assessing the amount of material which has been deposited on piston surfaces and in piston ring grooves. Currently, this evaluation procedure is done manually, using human visual assessment to classify the deposit color and coverage.

U.S. Pat. No. 9,957,887 to Roe et. al. describes a machine comprising a piston, a memory, and an electronic control module. The electronic control module configured to determine a temperature of a bowl rim of the piston. The electric control module further configured to calculate a temperature of an oil gallery of the piston based on the temperature of the bowl rim. The electric control module further configured to determine a carbon deposit growth rate of the piston based on the temperature of the oil gallery. The electric control module further configured to determine an amount of time between a current time and the time when the previous carbon deposit growth was calculated. The electric control module further configured to calculate a current carbon deposit growth on the piston and take a remedial action based on the current carbon deposit growth. The current carbon deposit growth is calculated based on: a previous carbon deposit growth on the piston, an amount of time between a current time and a time when the previous carbon deposit growth was calculated, and the carbon deposit growth rate.

The present disclosure is directed toward improvements in the art.

SUMMARY

A system and method of grading machined parts with deposits upon the outer surface are disclosed herein. In embodiments, a method of grading pistons includes increasing the temperature of the piston. The method further includes performing a thermal scan of the outer surface of the piston and any deposits there on. The method further includes generating thermal scan data from the thermal scan representing temperatures at a plurality of locations upon the outer surface of the piston. The method further includes identifying deposit locations from the temperatures at the plurality of locations upon the outer surface of the piston by identifying temperature differences with respect to a temperature of the outer surface of the piston. The method further includes generating deposit characteristics from the deposit locations and magnitude of temperature differences with respect to the temperature of the outer surface of the piston. The method further includes grading the piston with regard to the deposit characteristics.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

Figure 1:
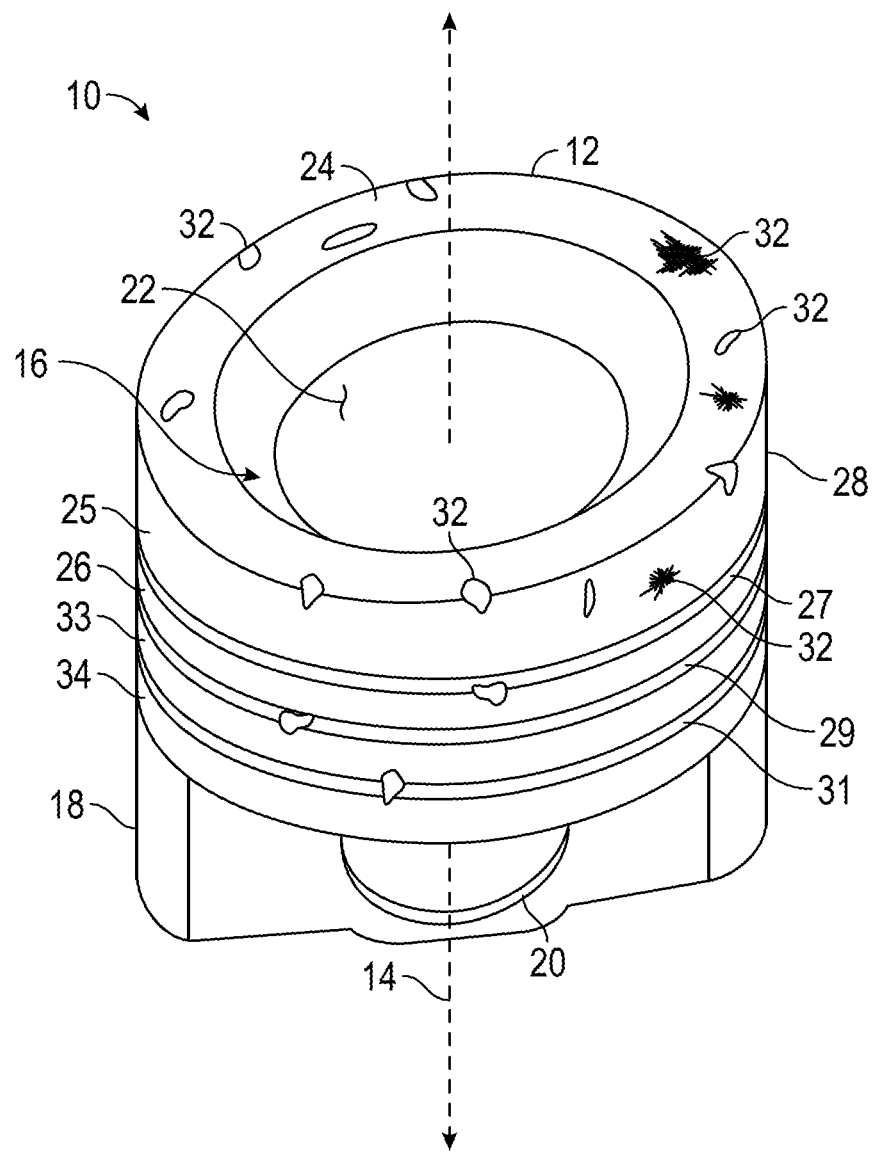
FIG. 1 is a schematic illustration of an exemplary piston with deposits.

FIG. 1 is schematic illustration of an exemplary piston with deposits. FIG. 1 includes a piston 10 with a piston body 12 after being in use within an internal combustion engine for a period of time. Piston body 12 includes a piston combustion surface 16 (the upper surface) and a piston skirt 18 (the lower portion) and defines a longitudinal axis 14. A wrist pin bore 20 extending normal to axis 14 is formed in skirt 18 and configured to receive a wrist pin for coupling piston body 12 with a piston rod in a conventional manner. A combustion bowl 22 is formed into the piston 10 and is surrounded by an annular rim 24 circumferential of axis 14. In other embodiments the piston 10 can have other configurations such as having a flat top or domed portion instead of a combustion bowl 22 and annular rim 24. A plurality of piston ring grooves including a first groove 27 (sometimes referred to as a top piston groove) a second groove 29, and a third groove 31 are formed in an outer surface 28 of piston body 12, and also extend circumferentially around longitudinal axis 14. The outer surface 28 may include a first land 25 (sometimes referred to as a top land) a second land 26, a third land 33, and a fourth land 34. The first land 25, the second land 26, the third land 33, and the fourth land 34 may be axially spaced apart from each other along the longitudinal axis 14 and can be separated by the plurality of piston ring grooves.

The first land 25 may be positioned adjacent to the combustion surface 16. In an embodiment the first land 25 can be disposed closer to the combustion surface 16 than the second land 26. The third land 33 may be positioned between the second land 26 and the fourth land 34. The fourth land 34 may be positioned furthest from the combustion surface 16. The first groove 27 may be positioned between the first land 25 and the second land 26. The first groove 27 may be disposed closer to the first land 25 than the second groove 29 and the third groove 31. The third groove 31 may be positioned between the third land 33 and the fourth land 34. The third groove 31 may be positioned further from the combustion surface 16 than the first groove 27 and the second groove 29. The piston body 12 may be formed of a base material 34 such as steel or aluminum used in originally manufacturing the piston.

After operating within an internal combustion engine for a period of time, the piston 10 may acquire deposits 32. The deposits 32 can be located on the outer surface 28 and combustion surface 16 of the piston 10. Deposits 32 may include for example, a buildup of carbon. The deposits 32 in some instances might be deposits of foreign material on the piston body 12, or still another feature.

Figure 2:
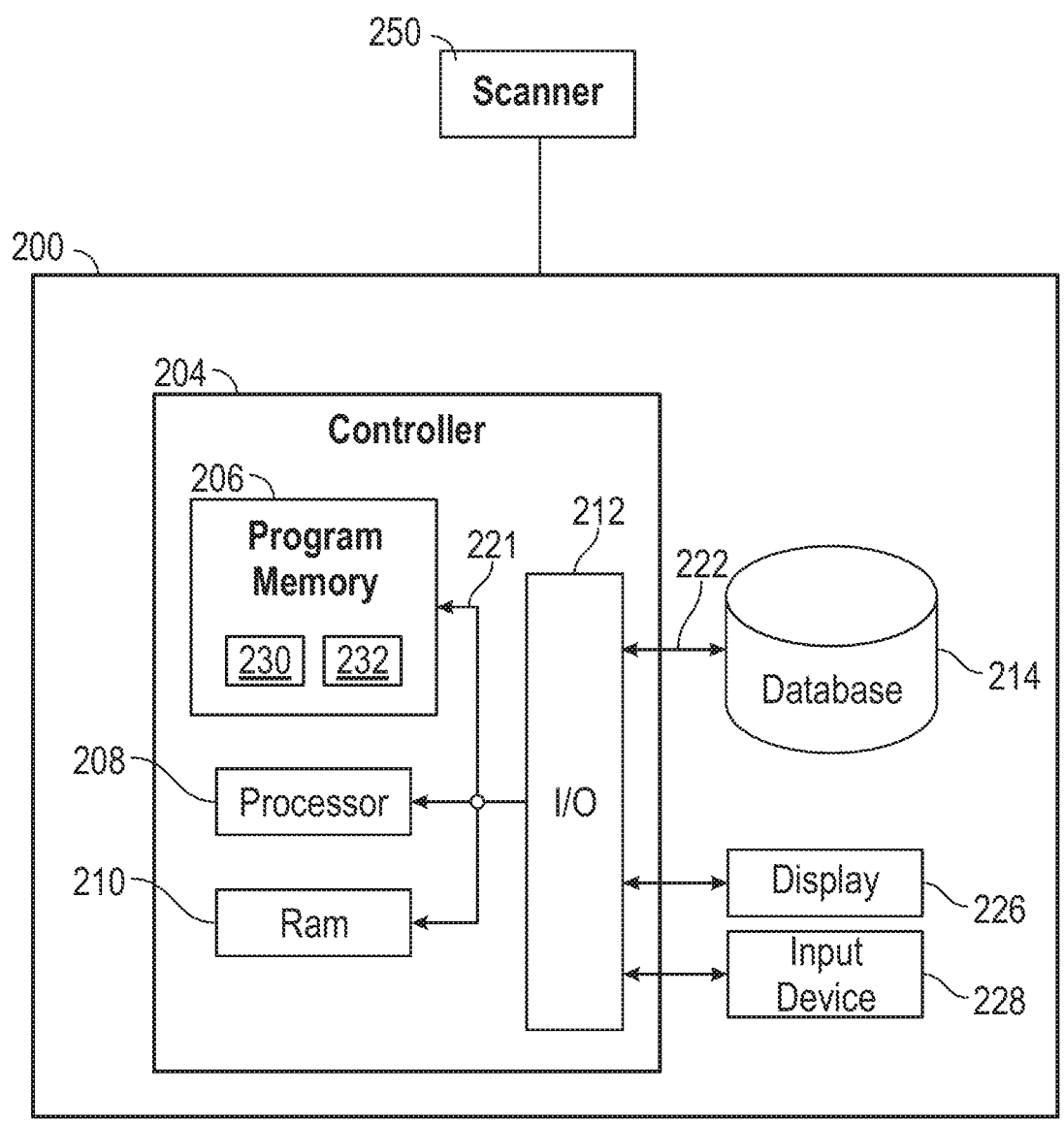
FIG. 2 is a functional block diagram of a computer system.

FIG. 2 is a functional block diagram of a computer system 200. In certain embodiments, the computer system 200, sometimes referred to as a piston grading system, is in communication with a thermal scanner 250 (sometimes referred to as a thermal camera). In other examples the thermal scanner 250 can include a computer such as the computer system 200. The thermal scanner 250 can be a thermal scanner that captures temperature information. The thermal scanner 250 can be a Fluke Ti45 camera. The computer system 200 may have a controller 204 operatively connected to a database 214 via a link 222 connected to an input/output (I/O) circuit 212. It should be noted that, while not shown, additional databases 214 may be linked to the controller 204 in a known manner. Furthermore, these databases 214 may be external to the computer system 200.

The controller 204 can include a program memory 206, the processor 208 (may be called a microcontroller or a microprocessor), a random-access memory (RAM) 210, and the input/output (I/O) circuit 212, all of which are interconnected via an address/data bus 221. It should be appreciated that although only one microprocessor 208 is shown, the controller 204 may include multiple microprocessors 208. Similarly, the memory of the controller 204 may include multiple RAMs 210 and multiple program memories 206. Although the I/O circuit 212 is shown as a single block, it should be appreciated that the I/O circuit 212 may include a number of different types of I/O circuits. The RAM(s) 210 and the program memories 206 may be implemented as semiconductor memories, magnetically readable memories, nonvolatile memories, and/or optically readable memories, for example.

The program memory 206 and RAM 210 can be a non-transitory computer-readable medium having stored thereon computer-executable code (e.g., disclosed software or subroutines) and/or data. The program memory 206 and/or the RAM 210 may store various applications (i.e., machine readable instructions) for execution by the microprocessor 208. For example, an operating system 230 may generally control the operation of the computer system 200 and provide a computing environment to implement the processes described herein. The program memory 206 and/or the RAM 210 may also store a variety of software 232 for accessing specific functions of the computer system 200. In addition to the controller 204, the computer system 200 may include other hardware resources. The computer system 200 may also include various types of input/output hardware such as the visual display 226 and input device(s) 228 (e.g., keypad, keyboard, mouse, etc.). In an embodiment, the display 226 can be touch-sensitive, and may cooperate with a software keyboard routine as part of the software 232 to accept user input. The software 232 may implement other functions, for example, implementing software keyboard functionality, interfacing with other hardware in the computer system 200, etc.

The display 226 can display user input fields through a graphical user interface. The input fields of the graphical user interface can accept information related to deposit dimensions and other information inputted by a user interacting with the input device 228.

The software 232 may include code to execute any of the operations described herein. The program memory 206 and/or the RAM 210 may further store data related to the configuration and/or operation of the computer system 200, and/or related to the operation of the software 232.

INDUSTRIAL APPLICABILITY

During product evaluation and product development, for example a newly designed piece of machinery, new pistons 10 can be installed into the machinery and operated for a specified amount of testing time to assess deposit buildup. In other examples the deposit build up is evaluated to evaluate various operating characteristics, engine settings, fuel rates, fuel patterns, and other characteristics of operating machinery. In some examples the deposits 32 comprise carbon.

After the testing time has been reached the dirty pistons can be removed from the machinery and assessed for deposit buildup to determine if the machinery operating characteristics are is acceptable or not acceptable.

Pistons with deposits are typically visually assessed per industry standards such as American Society for Testing and Materials (ASTM) standards. Any visual assessment can be prone to low accuracy and precision and be subjected to personal bias. For example, differences in visual assessments may vary from day to day from the same viewer and from person to person. Additionally, the visual assessment has no inherent relation to scientific quantities such as mass, volume, etc. This disconnect to scientific quantities causes simulation of the piston deposit issue to be difficult.

A method that grades pistons based on quantifiable data can decrease the grading time for each piston 10, reduce cost, and improve consistency of which pistons 10 are considered acceptable and which are considered not acceptable. In some examples the method is automated and can provide additional cost savings. By using the method disclosed herein, deposit characteristics can be captured without the need to cut a piston in half to utilize measuring devices that only provide two dimensional measurements.

Figure 3:
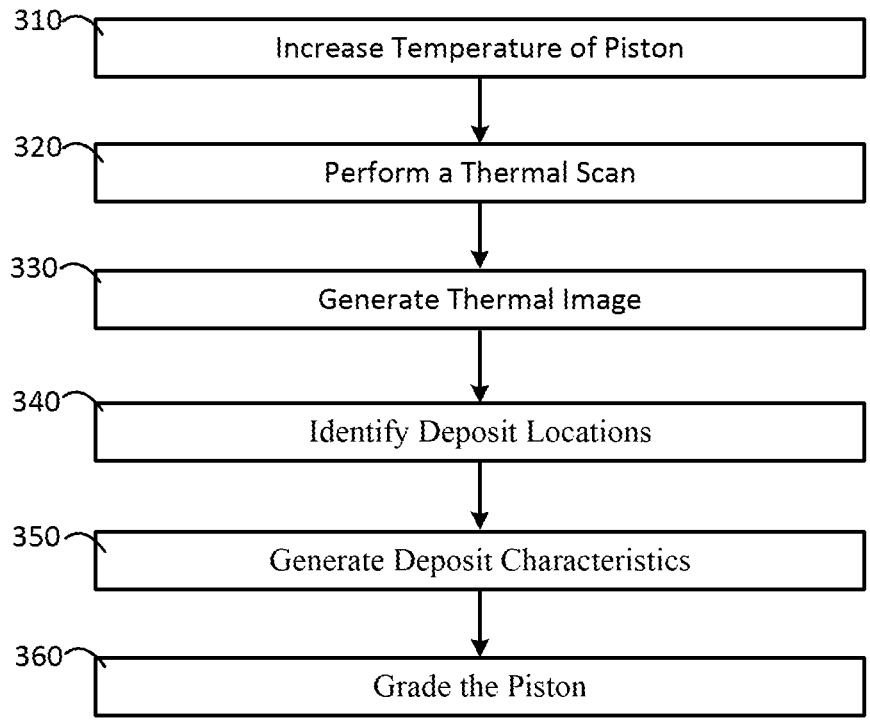
FIG. 3 is a flowchart of a method for grading a piston with deposits.

FIG. 3 is a flowchart of a method for grading pistons with deposits. The method begins at block 310 and can include increasing the temperature of the outer surface 28 of the piston 10. In other examples the method may include cooling the outer surface 28 of the piston 10. In an example the piston 10 can be heated with a heating element such as a heat gun. In an embodiment the heat is applied to the combustion surface 16. Heat can be applied to the piston 10 until a desired temperature at the outer surface 28 of the piston 10 is reached.

At block 320 a thermal scan can be performed of the outer surface 28 of the piston 10 and any deposits there on with the thermal scanner 250. The piston 10 may be in a dirty or used condition. In other embodiments the piston 10 can represent a different engine component or machined component, and can be scanned and graded in a similar fashion to the piston 10. The thermal scan can be performed by a thermal scanner 250, which may include a computer system 200. The scanning process can measure temperature at a plurality of locations upon the outer surface 28 of the piston 10. In an embodiment, thermal scan data is generated from the thermal scan by the computer system 200 and can represent the temperatures measured on the outer surface 28 of the piston 10 at defined locations. In an example the temperatures are measured at locations oriented in a grid. The thermal scanner 250 can transmit the temperature measurements relating to the piston 10 to the computer system 200. In other words, the computer system 200 receives the thermal scan of the piston 10. In examples multiple scans can be performed and scans can be taken at different angles and rotations.

In an embodiment, at block 330 a thermal image can be generated from the thermal scan of the piston 10. The computer system 200 can generate the thermal image from the thermal scan information, such as temperature measurements, sent from the thermal scanner 250. In an embodiment, the software of the computer system 200 can generate the thermal image from the thermal scan information sent from the thermal scanner 250. In other embodiments the thermal scanner 250 generates the thermal image. The thermal image of the outer surface 28 of the piston 10 can have a visual temperature gradient. The temperature gradient may be a range of colors with associated temperature measurement values. In other words the temperature gradient can visually represent the comparative difference in temperature at different locations on the outer surface 28. In an embodiment the temperature gradient can be limited to a temperature window of approximately 5 degrees Fahrenheit. In other examples the temperature gradient can be limited to a temperature window of 2 degrees or 3 degrees Fahrenheit. In another example the temperature gradient can be limited to a temperature window of less than 2 degrees Fahrenheit. In some embodiments, this block is not performed.

At block 340 deposit locations 32 can be identified from the temperatures at the plurality of locations upon the outer surface 28 of the piston 10 by identifying temperature differences with respect to a temperature of the outer surface 28 of the piston 10. For example as the piston 10 is warmed up and increases in temperature, the temperature of the outer surface 28 of the piston 10 can increase greater than the deposits 32. The thermal image can show these comparatively cold locations based on the difference in temperature recorded by the thermal scanner 250.

In an example deposit 32 locations can be identified from the thermal image by identifying temperature difference with respect to a temperature of the outer surface 28 of the piston 10.

At block 350 deposit characteristics can be generated from the deposit locations and the magnitude of temperature differences with respect to the temperature of the outer surface 28 of the piston 10. Deposits characteristics can include composition, density, geometry, thickness and other characteristics of the deposits. In an example, the magnitude of the temperature difference can indicate the density or composition of the deposit. If the deposit is mostly uniform in density and/or composition, the magnitude of temperature difference can relate to thickness of the deposits.

At block 360 the piston 10 can be graded as acceptable or not acceptable based on, for example, the deposit characteristics and a deposit characteristic threshold. The grading can be performed by the computer system 200. The deposit characteristic threshold can be set at a specific value. If the measurement data exceeds the threshold, the piston 10 can be graded as not acceptable. If the measurement data is less than the threshold, the piston 10 can be graded as acceptable. If the pistons 10 are graded as acceptable, the machinery product development can proceed without requiring adjustments to reduce deposit 32 formation. In an example, the grading can have multiple tiers such as the machinery being graded as no redesign needed, light redesign needed, medium redesign needed, heavy redesign needed, and not acceptable.

In an example each deposit 32 can be assigned a grade with regards to the deposit characteristics such as geometry, density, and thickness. In an example, the location of the deposit 32 can generate a grade. For example, deposits 32 on second land 26 may get a worst grade than deposits 32 on the first land 25. Each deposit grade can be recorded and a cumulative grade can be assigned to the piston 10 with regards to the cumulative grade. Based on the cumulative grade and/or the individual deposit grades, the piston 10 can be sorted as acceptable or not acceptable.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A method of grading a piston with an outer surface and deposits upon the outer surface, the method comprising:
   changing the temperature of the outer surface of the piston;
   performing a thermal scan of the outer surface of the piston and one or more deposits there on;
   generating thermal scan data from the thermal scan representing temperatures at a plurality of locations of the outer surface of the piston;
   identifying deposit locations from the temperatures at the plurality of locations upon the outer surface of the piston by identifying temperature differences with respect to a temperature of the outer surface of the piston;
   generating deposit characteristics from the deposit locations and magnitude of the temperature differences with respect to the temperature of the outer surface of the piston; and
   grading the piston with regard to the deposit characteristics.

2. The method of claim 1, wherein the deposit characteristics include density of the deposits.

3. The method of claim 1, wherein the deposit characteristics include geometry of the deposits.

4. The method of claim 1, wherein the deposit characteristics include thickness of the deposits.

5. The method of claim 1, wherein the deposits are carbon based.

6. A method of grading a piston with an outer surface and deposits upon the outer surface, the method comprising:
   increasing the temperature of the piston using a heating gun;
   generating a thermal image of the outer surface of the piston and any deposits there on, including a visual temperature gradient;
   identifying deposit locations from the thermal image by identifying temperature differences with respect to a temperature of the outer surface of the piston;
   generating deposit characteristics from the deposit locations and magnitude of the temperature differences with respect to the temperature of the outer surface of the piston; and
   grading the piston with regard to the deposit characteristics.

7. The method of claim 6, wherein the deposit characteristics include density of the deposits.

8. The method of claim 6, wherein the deposit characteristics include geometry of the deposits.

9. The method of claim 6, wherein the deposit characteristics include thickness of the deposits.

10. The method of claim 6, wherein the deposits are carbon based.

11. A piston grading system comprising:
    at least one processor; and
    a memory storing software that, when executed by the at least one processor causes the processor to, perform a thermal scan of an outer surface of a piston and any deposits there on;

generate thermal scan data from the thermal scan representing temperatures at a plurality of locations upon the outer surface of the piston;

identify deposit locations from the temperatures at the plurality of locations upon the outer surface of the piston by identifying temperature differences with respect to a temperature of the outer surface of the piston;

generate deposit characteristics from the deposit locations and magnitude of the temperature differences with respect to the temperature of the outer surface of the piston; and grade the piston with regard to the deposit characteristics.

12. The piston grading system of claim 11, wherein the deposit characteristics include density of the deposits.

13. The piston grading system of claim 11, wherein the deposit characteristics include geometry of the deposits.

14. The piston grading system of claim 11, wherein the deposit characteristics include thickness of the deposits.

15. The piston grading system of claim 11, wherein the deposits are carbon based.

16. The piston grading system of claim 11, wherein the thermal scan of the outer surface of the piston is performed after the piston has been cooled.

17. The method of claim 1, wherein the piston has been used in a machine and the piston is removed from the engine with which it has been used during the thermal scan of the piston.

18. The method of claim 17, wherein the piston does not move during the thermal scan.

19. The method of claim 1, wherein the temperature of the outer surface of the piston is cooled.

20. The method of claim 1, wherein the temperature of the outer surface of the piston is increased using a heat gun while the piston is removed from an engine.

* * * * *